June 15, 1937.  F. W. BUCKLE  2,084,240
POULTRY FEEDER AND WATERER
Filed June 23, 1936   2 Sheets-Sheet 1

Francis W. Buckle
INVENTOR
BY Victor J. Evans & Co.
ATTORNEYS

June 15, 1937.  F. W. BUCKLE  2,084,240
POULTRY FEEDER AND WATERER
Filed June 23, 1936  2 Sheets-Sheet 2
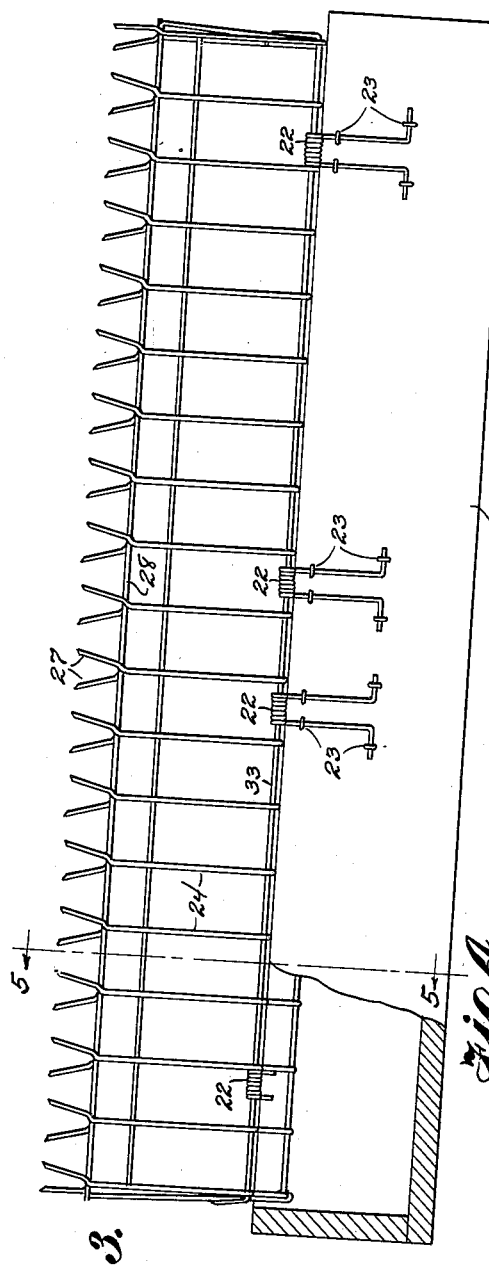
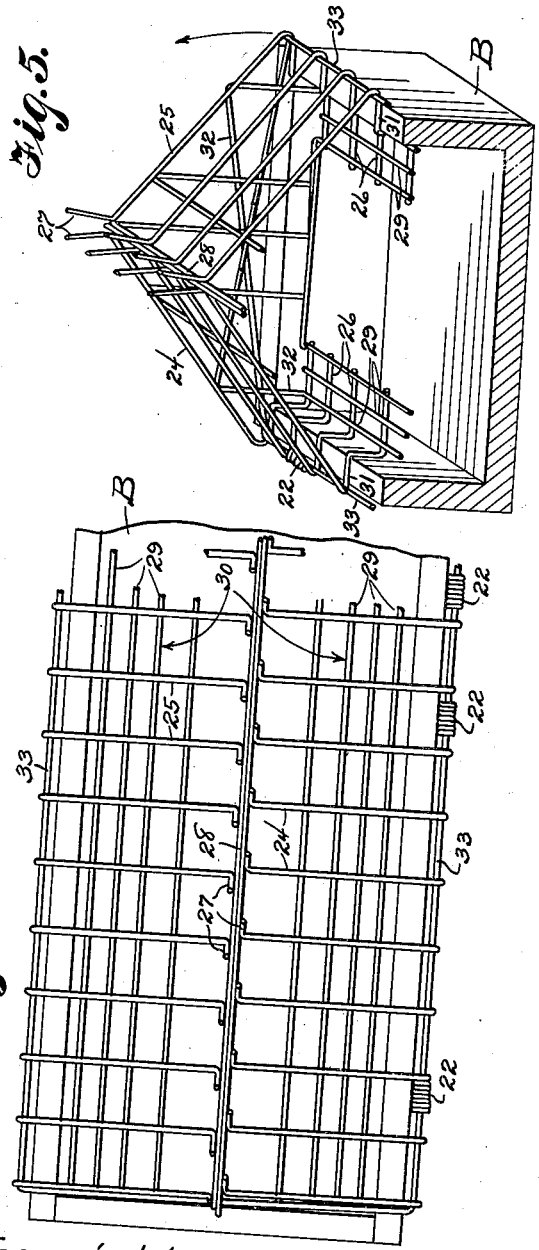
Francis W. Buckle INVENTOR
BY Victor J. Evans & Co.
ATTORNEYS Patented June 15, 1937

2,084,240

UNITED STATES PATENT OFFICE 2,084,240

POULTRY FEEDER AND WATERER

Francis Willard Buckle, Glanford Township, Ontario, Canada

Application June 23, 1936, Serial No. 86,881

4 Claims. (Cl. 119—61)

The invention relates to a poultry feeder and waterer and more especially to a guard for a poultry feeder or waterer.

The primary object of the invention is the provision of a guard of this character wherein the construction thereof is such as to prevent a fowl from scooping the feed out of a feeding trough or the like with its beak, thereby eliminating waste of the food or the scattering of the same on a floor or foundation supporting said feeder, it being also true that when the fowl drinks water it is required that the drinking be had from a center of the container for the water and in this way avoiding droppings outside of such container.

Another object of the invention is the provision of a guard of this character wherein the fowl is kept outside of the container, trough or the like during feeding or watering of such fowl, the guard being of novel construction and protecting the contents of the container, trough or the like, thereby insuring the food or water against contamination.

Another object of the invention is the provision of a guard of this character wherein the same when applied to a container, trough or the like will be held in proper position and be prevented against displacement during the use thereof.

A still further object of the invention is a provision of a guard of this character wherein the construction thereof is such as to enable it to be handled in a convenient manner for the placing upon a container, trough or the like or its removal.

A still further object of the invention is the provision of a guard of this character which is thoroughly reliable and simple in construction, neat in appearance, safe-effective in operation, assuring sani-guarding waste of feed or water, tary conditions during feeding or watering of poultry or the like, strong, durable and inexpensive to manufacture.

With these and other objects in view, the invention consists in the features of construction, combination and arrangement of parts as will be hereinafter more fully described, illustrated in the accompanying drawings, which disclose the preferred embodiments of the invention and pointed out in the claims hereunto appended.

In the accompanying drawings:

Figure 3 is a side elevation partly in section of a modified form of guard.

Figure 4 is a fragmentary top plan view thereof.

Figure 5 is a fragmentary perspective view of the same and the line of cut being approximately at 5—5 of Figure 3.

Similar reference characters indicate corresponding parts throughout the several views in the drawings.

Figure 1:
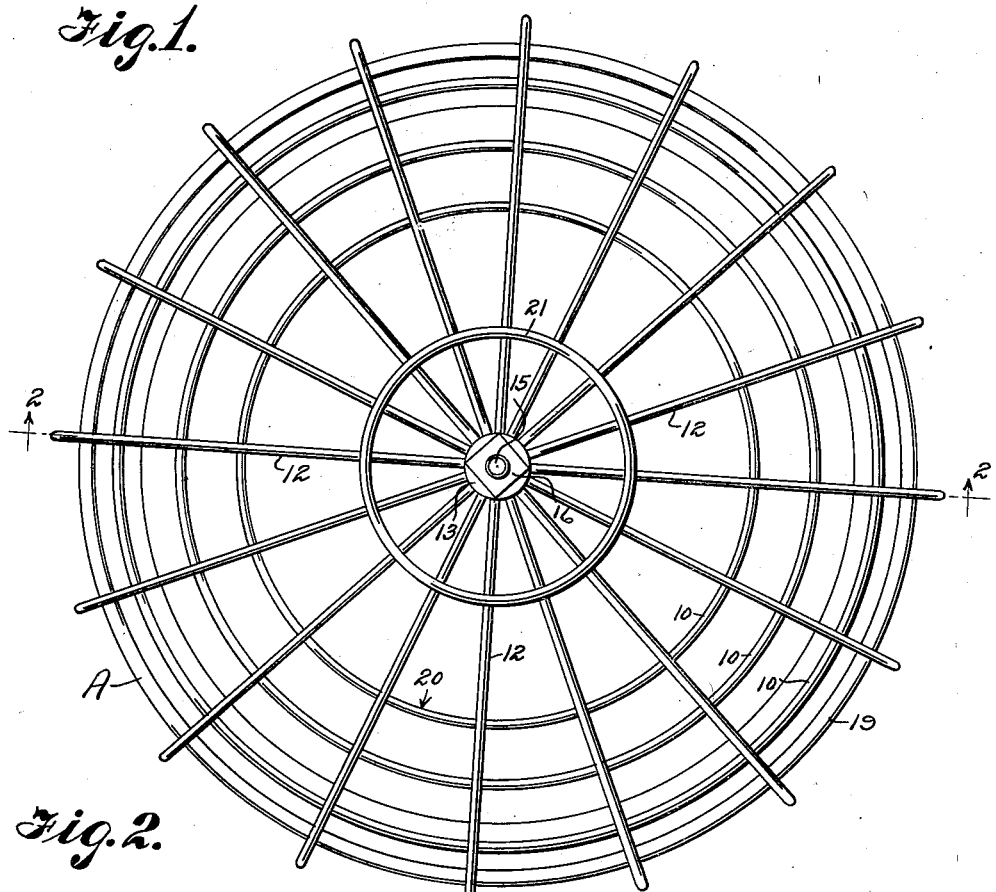
Figure 1 is a plan view of a guard constructed in accordance with the invention.
Figure 2:
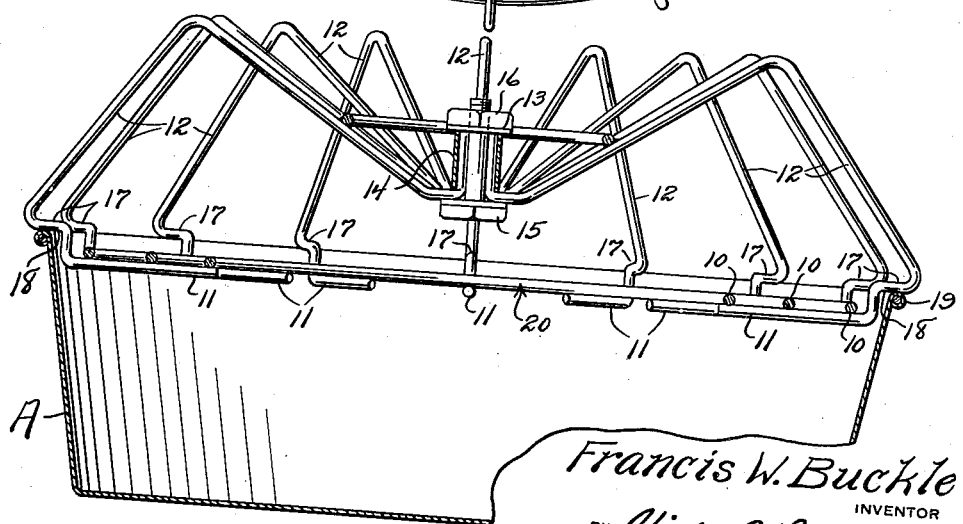
Figure 2 is a sectional view on the line 2—2 of Figure 1 looking in the direction of the arrows.

Referring to the drawings in detail, particularly Figures 1 and 2, A designates generally a pan, trough or the like, in this instance being of circular form, which constitutes a receptacle or holder for feed or water for poultry or the like. Adapted to be placed over this receptacle or holder A is a guard constituting the present invention and hereinafter fully described.

The guard comprises a series of circular rings or hoops 10 which are arranged in the same plane with each other and concentric with relation to one another while joined at determined intervals with the said series of rings or hoops 10 are the horizontally disposed inner ends 11 of a plurality of inverted substantially V-shaped crowning arms or members 12 which are perpendicular and extending radially with respect to the vertical central axis of the receptacle or holder A. The outer ends 13 of the arms or members 12 are bent upwardly for reception within a sleeve 14 which has passed therethrough a headed bolt 15 carrying a nut 16 threaded thereon. This bolt 15 with its nut 16 makes secure the ends 13 of the arms or members 12 within the sleeve 14. Provided next to the ends 11 of the arms or members 12 are the instruck bights 17 providing rest shoulders 18 peripherally of this guard and accommodating the edging 19 of the upper open side of the receptacle or holder A so that the guard will fit the latter within its upper open side and be prevented from displacement from the said receptacle or holder. The rings 10 and the horizontal ends 11 of the arms or members 12 effect a grating circumferentially of the receptacle or holder A at the inner periphery of the side wall thereof, the said ends 11 being extended toward the center of the receptacle or holder A to effect centrally thereof an unobstructed feeding opening 20 for poultry or the like. In other words the poultry or the like when acquiring feed from the receptacle or holder A will seek the same through the opening 20. It is practically impossible for the birds to take the feed from between the rings or hoops 10 and the ends 11 outside of and concentrically with respect to said opening 20 and in this fashion the feed will not be scattered in that the poultry or the like will be retarded from scooping the feed by their beaks out of the receptacle or holder A when the guard is in place thereon.

The horizontal ends 11 of the arms or members 12 together with the rings 10 joined therewith constitute a protecting flange concentric with respect to the vertical axis of the receptacle or holder A, thus compelling the poultry or the like to seek feed within the latter through the center opening 20 constituted within the guard.

Outside of the arms or members 12 and concentrically to the sleeve 14 is a ring or hoop 21 which is joined with the said arms or members 12 thus giving rigidity and strength to the arms or members 12 in the upstanding vertical arrangement thereof and at the same time maintaining the said arms or members 12 uniformly spaced from each other.

The inverted V-formation of the arms or members 12 will keep the poultry or the like out of the receptacle or holder A and prevent their perching upon this guard or upon the top edge of the said receptacle A, thereby insuring the feed or water held within the receptacle or holder A against contamination. It is, of course, understood that the arms or members 12 are suitably spaced from each other so that access may be had to the feed or water container at its center.

The sleeve 14 at the center of the guard and fastening the ends 13 of the arms or members 12 thereof, will function as a hand-grip or handle to permit convenient application and removal of the guard to and from the receptacle or holder A.

The joining of the rings or hoops 10 with the ends 11 and of the ring 21 with the arms or members 12 may be had through spot welding.

The rings or hoops 10, arms or members 12 and the ring 21 are made from proper gauge-wire having the required strength and rigidity and these parts when joined afford a unitary structure.

In Figures 3, 4 and 5 of the drawings there is shown a modified form of guard wherein the receptacle or holder B is of substantially rectangular shape and has fitted at one side wall thereof on its outer face pintle eyes 22, each being preferably made from a single length of wire coiled intermediate thereof to present the pintle eye. These coiled wires forming the pintle eyes are fastened to the receptacle or holder B by staples 23 or otherwise. Swingingly fitting the pintle eyes is the guard which comprises the series of reversely sloping lengths of wires 24 and 25 respectively which have horizontally bent inner ends 26 and upstanding outer ends 27 respectively, these lengths of wires 24 and 25 being united with rigid rods 28 joined or welded to each other next to the ends 27 and to longitudinally disposed rods 29, certain of the latter being joined with the ends 26 and the others with the lengths of wires 24 and 25 intermediate of their ends 26 and 27. The wires 24 and 25 effect a crown to the guard while the ends 26 effect a flange disposed next to the side walls of the receptacle or holder B longitudinally thereof so that a center feeding or watering opening 30 is created between these flanges. The wires 24 and 25 next to the ends 26 have inwardly struck bights 31 affording seats receptive of the top edges of the side walls of the receptacle or holder B. Certain of the rods 29 are formed with extensions 32 which are bent crosswise to the ends of the guard to effect a lattice formation at opposite ends of said guard. The rod 33 at one side of the guard is pintled in the eyes 22 for the hinging of the guard on the receptacle or holder B. This guard as heretofore described covers the upper open top of the receptacle or holder B and the ends 26 with the rods 29 connected therewith prevent the poultry or the like from scooping out food from within the receptacle or holder at opposite side walls of the latter, requiring the said poultry or the like to be fed or watered through the center opening 30 between the flanges effected by the ends 26 and the rods 29 connected therewith.

The ends 27 of the wires 24 and 25 in their upstanding position, prevent the poultry or the like from perching on the guard. The wires 24 and 25 of the guard are suitably spaced from each other so that the poultry may have access therebetween to the center opening 30 for feeding and watering purposes.

The hinging of the guard permits the latter to be swung to a crowning or non-crowning position with respect to the receptacle or holder B.

By reason of the construction of the guard in both the preferred and modified forms, poultry or the like cannot scatter feed or water contained within the receptacle or holder B and in this manner waste is avoided, such poultry or the like being required to acquire feed or water at the center of the receptacle or holder, that is to say through the center feeding or watering opening as created in the guard. The construction of the guard assures a sanitary condition to the feeder or waterer as it compels the poultry or the like to stand close in drinking and feeding from said receptacle or holder and by this the said poultry or the like acquiring feed or water must reach to the center of the feeder or waterer.

What is claimed is:

1. A guard of the kind described comprising a crowning frame for a poultry feeding or watering receptacle and having a plurality of wire lengths arranged spaced from each other, inturned inner ends formed from the wire lengths and spaced members disposed crosswise of the in-turned ends, these members together with the in-turned ends constituting a flanged area disposed in a horizontal plane interiorly and next to the side wall of the receptacle to provide an open space centrally located with respect to said receptacle.

2. A guard of the kind described comprising a crowning frame for a poultry feeding or watering receptacle and having a plurality of wire lengths arranged spaced from each other, inturned inner ends formed from the wire lengths and spaced members disposed crosswise of the in-turned ends, these members together with the in-turned ends constituting a flanged area disposed in a horizontal plane interiorly and next to the side wall of the receptacle to provide an open space centrally located with respect to said receptacle and bights in said wire lengths to provide a seat accommodating the top edge of the receptacle.

3. A guard of the kind described comprising a crowning frame for a poultry feeding or watering receptacle and having a plurality of wire lengths arranged spaced from each other, inturned inner ends formed from the wire lengths and spaced members disposed crosswise of the in-turned ends, these members together with the in-turned ends constituting a flanged area disposed in a horizontal plane interiorly and next to the side wall of the receptacle to provide an open space centrally located with respect to said receptacle, bights in said wire lengths to provide a seat accommodating the top edge of the receptacle, and upwardly extending portions formed in said wire lengths for preventing the poultry from perching on the said frame and on the top of the said receptacle.

4. A guard of the kind described comprising a crowning frame for a poultry feeding or watering receptacle and having a plurality of wire lengths arranged spaced from each other, inturned inner ends formed from the wire lengths and spaced members disposed crosswise of the in-turned ends, these members together with the in-turned ends constituting a flanged area disposed in a horizontal plane interiorly and next to the side wall of the receptacle to provide an open space centrally located with respect to said receptacle, bights in said wire lengths to provide a seat accommodating the top edge of the receptacle, upwardly extending portions formed in said wire lengths for preventing the poultry from perching on the said frame and on the top of the said receptacle, and means hinging the frame to the receptacle for vertical swinging of the latter to crowning or non-crowning position thereon.

FRANCIS WILLARD BUCKLE.